INVENTORS.
ARTHUR BRISKMAN
CURT WEIDAUER
BY THEODORE N. SAATY

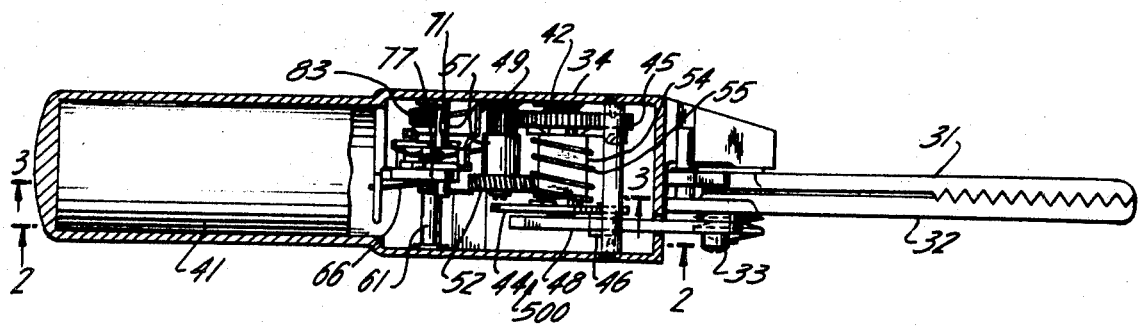
FIG.1
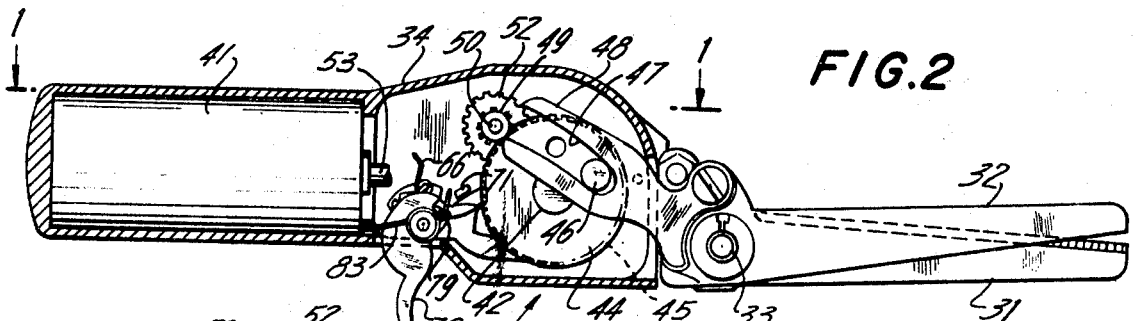
FIG.2
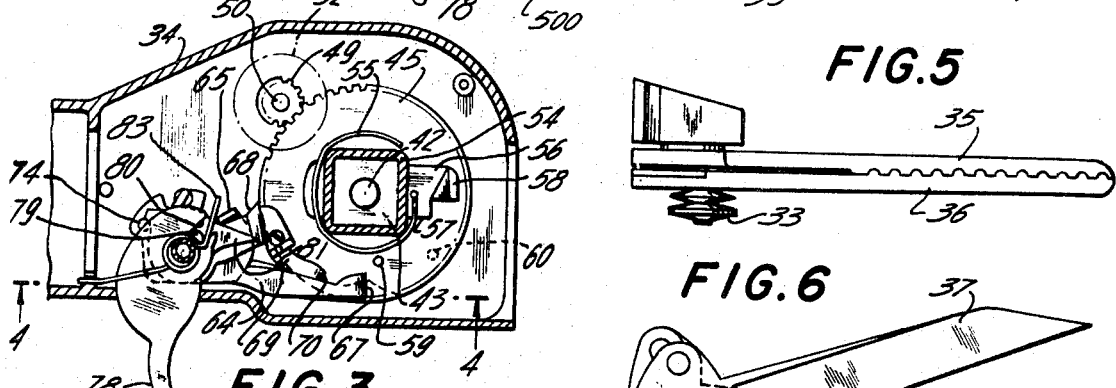
FIG.3
FIG.5
FIG.6
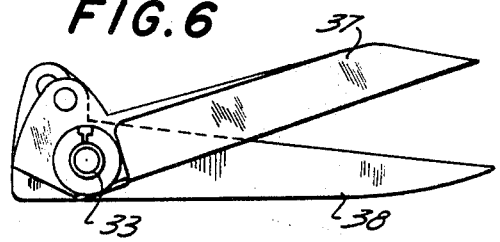
FIG.4
FIG.7
INVENTORS
ARTHUR BRISKMAN
CURT WEIDAUER
BY THEODORE N. SAATY
SPARROW AND SPARROW
ATTORNEYS.

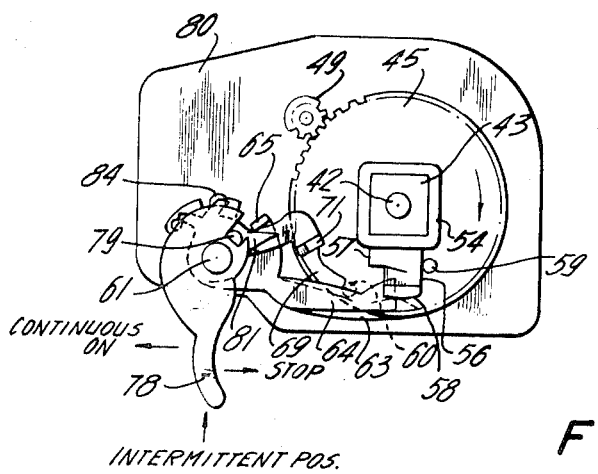
FIG. 9
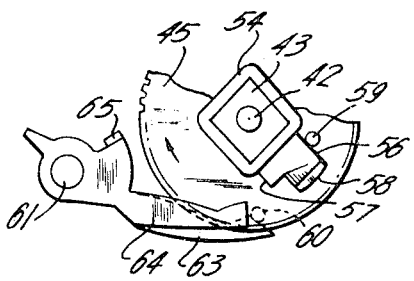
FIG. 12
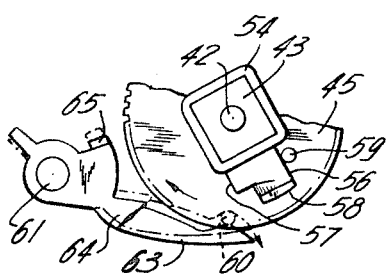
FIG. 13
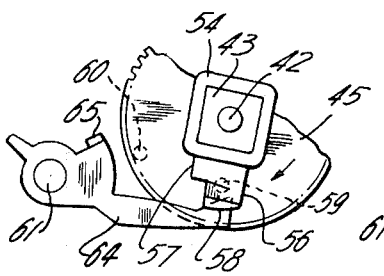
FIG. 14
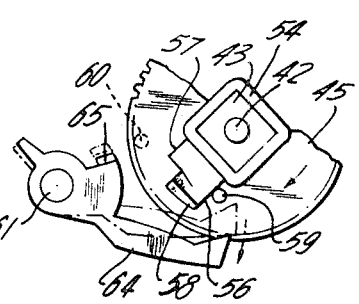
FIG. 15
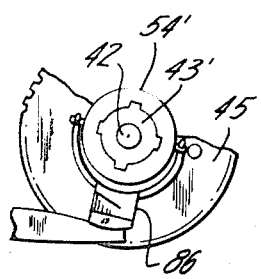
FIG. 18
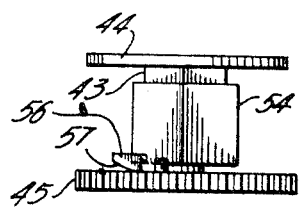
FIG. 16
FIG. 17
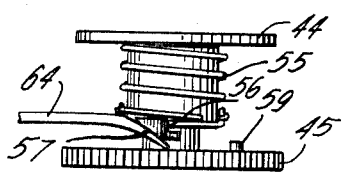
FIG. 19
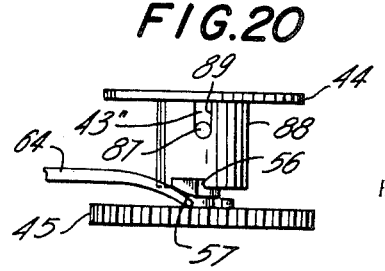
FIG. 20
INVENTORS.
ARTHUR BRISKMAN
CURT WEIDAUER
BY THEODORE N. SAATY
SPARROW AND SPARROW
ATTORNEYS

SPARROW AND SPARROW
ATTORNEYS 3,583,067
UNIVERSAL POWER-OPERATED HANDTOOL
Arthur Briskman, 102 Prince St., New York, N.Y.
10012, Curt Weidauer, Clinton Corners, N.Y., and
Theodore N. Saaty, Newark, N.J.; said Weidauer and
Saaty assignors to said Briskman
Filed July 12, 1968, Ser. No. 744,545
Int. Cl. B26b 15/00
U.S. Cl. 30—228          31 Claims

ABSTRACT OF THE DISCLOSURE

Power-operated handtool mechanically driven by an electric motor, activatable for cutting, filing, sanding, burnishing and like purposes. The tool includes drive mechanism which can be set for intermittent, reciprocal, or continuous motion or for stopping the motion of cutter, etc., while the drive motor continues to run. A switch for reversing the running of the motor may be provided.

BACKGROUND OF THE INVENTION

The invention refers generally to power-operated handtools with trigger control means and particularly to power-operated shears, such as pinking shears, scissors, snips or the like tools which have two cooperating blades, one of which is stationary while the other performs a shearing intermittent or reciprocating motion to and from the stationary one; and to those tools which have facilities for reciprocating movement for sawing, sanding, buffing, polishing tools, mortising tools and the like. It is intended by this invention to create an improved and novel versatile tool for operation which are performed by hand and which are known to be tiresome, hence slowing down after a certain time. Motorized cutting tools of the kind described are disclosed in our application Ser. No. 621,992, filed Mar. 9, 1967, now Pat. No. 3,408,875 granted Nov. 5, 1968, the invention herein described being an improvement thereof.

SUMMARY OF THE INVENTION

The invention consists in such novel features, construction, arrangements, combinations of parts and improvements as may be shown and described in connection with the devices herein disclosed by way of example only and as illustrative of preferred embodiments. The novel structure of the improved mechanism constitutes simplification and increased versatility of the tool described in our said co-pending application.

The power-operated tool according to a mode of the invention for driving a movable tool member such as a shear blade, saw, etc., generally comprises motor means, drive means connected to the motor means for operating the movable tool member, and trigger means controlling operations of the drive means, the drive means comprising a continuously rotatable member, a second rotatable member and means for transmitting motion from the continuously rotatable member to the second rotatable member for continuous, intermittent and stop motion thereof selectively controllable by the trigger means. The motion transmitting means has means for selective operation of the second rotatable member by the continuously rotatable member through activation of the trigger means, the second rotatable member having means for connection with the movable tool member for driving the latter. The continuously rotatable member is rotatably mounted on a stationary shaft. The motion transmitting means comprises a shaft which is rotatably mounted with relation to the stationary shaft and which fixedly carries the second rotatable member, liftable means adapted to be rotated by the rotatable shaft, spring means to urge the liftable means in one direction and means cooperable with the continuously rotatable member, the second rotatable member and the liftable means, which motion-transmitting means is controllable by the trigger means. The liftable means may consist of a sleeve longitudinally movable on the rotatably mounted shaft or a hinged bar member or arm.

Objects and advantages will be set forth in part hereafter and in part will be obvious herefrom or may be learned by practicing the invention, the same being realized and attained by means of the instrumentalities and combinations pointed out in the appended claims.

It is an object of the present invention to provide a universal power-driven handtool for the purposes hereinabove indicated which is efficient, light-weight in construction and can be easily operated with one hand, and which thus has great versatility of uses.

It is a further object of the present invention to provide a motorized cutting tool with an improved and simplified mechanism and improved control means for various modes of operation and facilities for shifting easily from one mode of operation to another mode of operation while the tool device is running.

Various further and more specific purposes, features and advantages will clearly appear from the detailed description given below taken in connection with the accompanying drawings which form part of this specification and illustrate merely by way of examples embodiments of the device of the invention.

BRIEF DESCRIPTION OF THE DRAWING

In the following description and in the claims, parts will be identified by specific names for convenience, but such names are intended to be as generic in their application to similar parts as the art will permit. Like reference characters denote like parts in the several figures of the drawing in which:

FIG. 1 is a top view of a tool according to the invention showing the inner mechanism of the tool with the housing cut away along the line 1—1 in FIG. 2;

FIG. 2 is a side view of the mechanism of the tool, with the housing cut away along the line 2—2 in FIG. 1;

FIG. 3 is a partial view of the trigger mechanism of the tool in an enlarged scale seen in FIG. 2, partly cut away, and taken along the line 3—3 in FIG. 1.

FIG. 4 is a side view of the mechanism shown in FIG. 3, viewed in the direction of the arrow 4—4 in FIG. 3;

FIG. 5 is a side view of scalloping shear blades, interchangeable with the pinking shear blades shown in FIG. 1;

FIG. 6 is a view of a pair of interchangeable straight-edge scissors;

FIG. 7 is a view of an interchangeable pair of sheet metal snips;

FIG. 9 shows the position of the trigger mechanism for "intermittent motion";

FIG. 10 shows the position of the trigger mechanism for "continuous motion";

FIG. 11 shows the position of the lower part of the fork lever set for "continuous motion," viewed from below;

FIGS. 12, 13, 14, 15, 16 and 17 show various phases of the operation of the mechanism;

FIG. 18 shows a plan view of another embodiment of the drive sleeve;

FIG. 19 is a side view of the drive sleeve shown in FIG. 18;

FIG. 20 is a side view of a further embodiment of the sleeve shown in FIG. 19;

FIG. 21 is a view of another version of the forked lever shown in FIG. 8, partly cut away;

FIG. 8A is an exploded view of a trigger mechanism in a modified form;

FIG. 8B is an enlarged view of the trigger plate seen in FIG. 8A;

DESCRIPTION OF THE PREFERRED EMBODIMENTS

Figure 8:
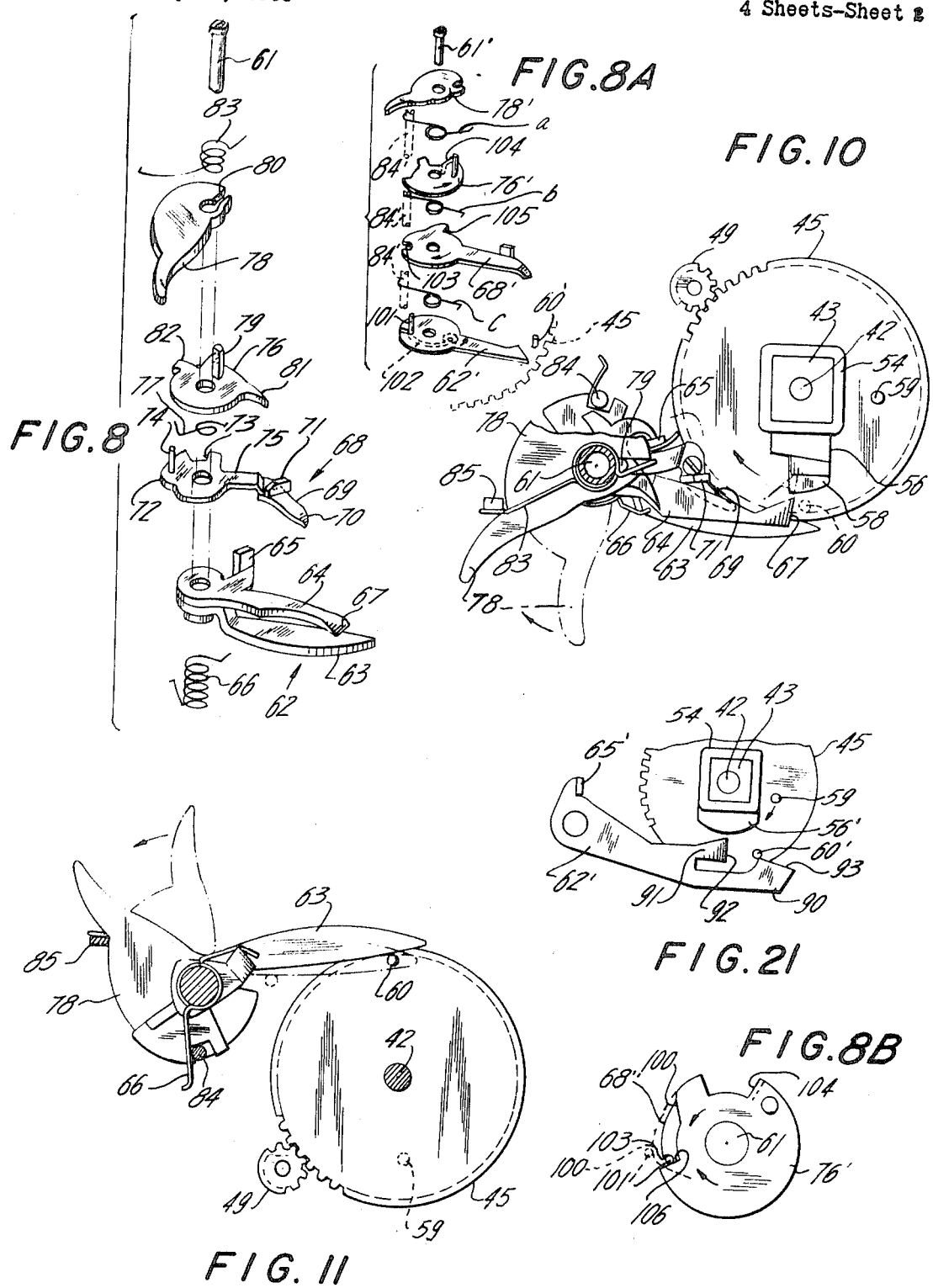
FIG. 8 is an exploded view of the trigger mechanism shown in FIGS. 3 and 4.

Referring now in more detail to the drawing illustrating by way of examples preferred embodiments by which the invention may be realized, there is shown in FIGS. 1 and 2 power-operated shears generally designated by the numeral 500. The shears therein shown as an example are pinking shears, having a stationary blade 31 and a movable blade 32, which is mounted on a pivot 33. Stationary blade 31 is fastened on the housing 34 which encloses the operating mechanism of the shears. It is understood that other types of cutting tools may be used instead of pinking shears 31, 32, some of which are depicted in FIGS. 5, 6 and 7 by way of example. FIG. 5 shows scalloping shears 35, 36, FIG. 6 straight edge scissors 37, 38 and FIG. 7 sheet metal cutting snips 39, 40. As it will be explained later, further tools may be used in conjunction with the basic power tool 500, by adding a suitable attachment.

Housing 34 may be made of a light-weight material, preferably of aluminum or of one of the alloys thereof or of suitable plastic. An electric motor 41 is enclosed in one part of housing 34 and the operating mechanism which is driven by motor 41, is located in the other part of housing 34. A stationary shaft 42 is arranged in housing 34. A hollow shaft 43 is rotatably mounted on shaft 42. Hollow shaft 43 carries on one end a disk 44. A spur gear 45 is freely rotatably mounted on shaft 42 adjacent the other end of hollow shaft 43. Hollow shaft 43 is preferably of square shape as shown in FIGS. 3, 9, 10 and 13 to 17, but may be also a spline shaft 43', as shown in FIG. 18, or a round shaft 43", as shown in FIG. 20. Disc 44 has on its upper surface a stud 46 arranged at a certain radius, which engages a slightly curved slot 47 of the driving arm 48 of movable blade 32, 36, 37 or 40. Thus, when disc 44 is rotated, movable blade 32, 36, 37 or 40 will perform the cutting operation by the engagement with stationary blade 31, 35, 38 or 39. Spur gear 45 is driven by a pinion 49 which is rotatably arranged on stud 30. Pinion 49 is mounted on sleeve 51 which freely rotates on stud 50 and which carries worm wheel 52. A corresponding worm (not shown in the drawing) which is mounted on shaft 53 of motor 41, engages drivingly worm wheel 52. It is understood that further intermediate gears may be arranged between pinion 49 and spur gear 45 for a greater speed reduction.

A vertically movable sleeve 54 is fitted on hollow shaft 43 (or 43', 43") and is urged downwardly by a helicoidal spring 55. Sleeve 54 has a protruding bar 56 or equivalent protrusion on its lower end. Bar 56 has a ramp-like face 57 on the underside thereof and a stop 58 at the outer end thereof, as shown in FIGS. 3, 4, 9, 13, 16, 17, 19, 20. Spur gear 45 has two pins, one pin 59 on the upper surface and the other pin 60 on the face below. Pins 59 and 60 are arranged on two different radii, pin 59 closer to the center of spur gear 45, pin 60 closer to the periphery thereof. Pin 59 is arranged to engage drivingly bar 56 when spur gear 45 is rotating; and thus drives by way of sleeve 54 and hollow shaft 43 disc 44, the stud 46 of which moves in slot 47 driving swingingly blade 32 back and forth. But such "continuous" operation of the shears is only possible when the trigger and control mechanism which will now be described in detail, is in a certain position. Three levers and a finger-operated trigger are rotatably arranged on a stationary vertical shaft 61, as shown in the exploded view of FIG. 8. The lowermost double arm lever 62 has two horizontally extending arms 63 and 64, long and short, respectively, and an engaging lug 65 which is bent upwardly at right angle of arms 63, 64, which straddle spur gear 45 in such manner that arm 63 reaches below gear 45 and can be engaged there by pin 60, whereas arm 64 extends in gliding contact over the upper surface of gear 45. Lever 62 is subjected to the tension of a torsion spring 66 which urges lever 62 constantly in a counter-clockwise direction inwardly toward spur gear 45. Arm 64 has on its forward end a tapered face 67 on which ramp-like face 57 of bar 56 of sleeve 54 may ride up, lifting sleeve 54 vertically against the pressure of spring 55.

The intermediate lever 68 has a forward arm 69 which has also a tapered end 70 glidingly engaging upper surface of spur gear 45. Arm 69 is arranged to slide partly under upper arm 64. Arm 69 has furthermore a stop 71 perpendicularly protruding over the surface of arm 69. On the rear arm 72 of lever 68 is a cut-out 73 and a vertically upwardly extending pin 74. Lug 65 is arranged to engage a face 75 of lever 68 in a certain position of lever arm 64.

A trigger plate 76 is rotatably arranged on top of intermediate lever 68. A spring 77 is interposed between plate 76 and lever 68 for holding lever 68 and lever 62 down while it holds plate 76 upwards against trigger 78. Trigger plate 76 has a pin 79 vertically disposed on the upper face thereof, pin 79 engaging a slot 80 in trigger 78. Triggerplate 76 has a first finger 81 which engages lug 65 of lever arm 64, and has a second finger 82 opposite finger 81, which engages pin 74 of lever 68. A torsion spring 83 is arranged on trigger 78 for urging the latter continuously in a counter-clockwise direction against a stop 84 by which the rotating movement is limited.

OPERATION OF THE MECHANISM

When motor 41 is energized spur gear 45 is driven in clockwise direction by way of pinion 49, worm wheel 52 and the worm (not shown in the drawing) on shaft 53 of motor 41. Trigger 78 is in the "stop" position (FIG. 9) whereby lever 62 is in an inactive position and lever 68 is held in the position where arm 69 with tapered end 70 is counterclockwise swung into the path of ramp-like face 57 of protruding bar 56 of sleeve 54. Pin 60 comes first into contact with lever arm 63 urging lever 62 clockwise out of engagement between tapered face 67 of upper arm 64 and ramp-like face 57. Pin 59 drives sleeve 54 in the clockwise direction until face 57 rides up on tapered end 70, lifting sleeve 54 up against the pressure of spring 55 so that pin 59 may slip under bar 56 while stop 58 comes to a rest against stop 71 of lever 68. The result is that motor 41 can keep running and driving spur gear 45 while disc 44 which is connected with shaft 43, does not rotate, thus not operating shear blade 32.

By pulling trigger 78 all the way clockwise to its stopping point, lever 62 is pulled out of the way of engagement between lower arm 63 and pin 60, and since lug 65 takes lever 68 with it, lever arm 69 is also pulled out of the way, pin 59 can drive sleeve 54 by way of bar 56 continuously, thus driving disc 44. The result is a continuous operation of the shear blade 32.

However, it is sometimes desirable to have an intermittent shear operation. This is achieved by pulling trigger 78 into an intermediate position. Lug 65 thereby pulls lever 68 slightly back so that tapered end 70 is not engaged by face 57; but lever arm 63 can be swung back by pin 60, and can return to its engaging position after pin 60 has passed permitting tapered face 67 to get into the path of face 57. Sleeve 54 is lifted by bar 56 riding up on a portion of the tapered face and pin 59 slips through below bar 56. The motion of sleeve 54 and of shear blade 32 is stopped until at the next revolution of spur gear 45, pin 60 pushes lever 62 by engaging lever arm 63, upper arm 64 allows bar 56 to drop permitting pin 59 to engage bar 56, rotating sleeve 54 (and thus disc 44) for the next following full revolution until at the end of this revolution the cycle is repeated.

A safety catch is built in the mechanism. When trigger 78 is in the "stop" position, the engagement of pin 79 with slot 80 holds plate 76 under the force of spring 83 with second finger 82 against pin 74 so that lever 68 cannot move out of the path of stop 58 and of ramp-like face 57, and the shears cannot operate.

MODIFICATIONS OF THE MECHANISM

While an operative structure is shown in FIGS. 1-4 and 8-17 having a square shaft and a square sleeve, FIGS. 18-20 show the use of a round shaft, whereby a hinged bar member 86 is swingably held under the force of spring 55, instead of using a vertically movable sleeve. Instead of a spline shaft 43' a smooth shaft 43" may be used (FIG. 20), having an engaging pin 87 for a round sleeve 88 having a corresponding slot 89.

Instead of having pins 59 and 60 arranged on opposite sides of spur gear 45, they may be both located on the upper face of spur gear 45. Double arm lever 62' then will not have arms 63 and 64 vertically arranged one above the other with gear 45 passing between them but will have arms 90 and 91, long and short respectively, in one plane above spur gear 45. This modified arm 62' is shown in FIG. 21, where pin 60' can engage face 93 for moving the lever while arm 91 has the tapered end 92 for permitting ramp-like face 57' to ride up. Lug 65 is comparable to lug 65.

Figure 22:
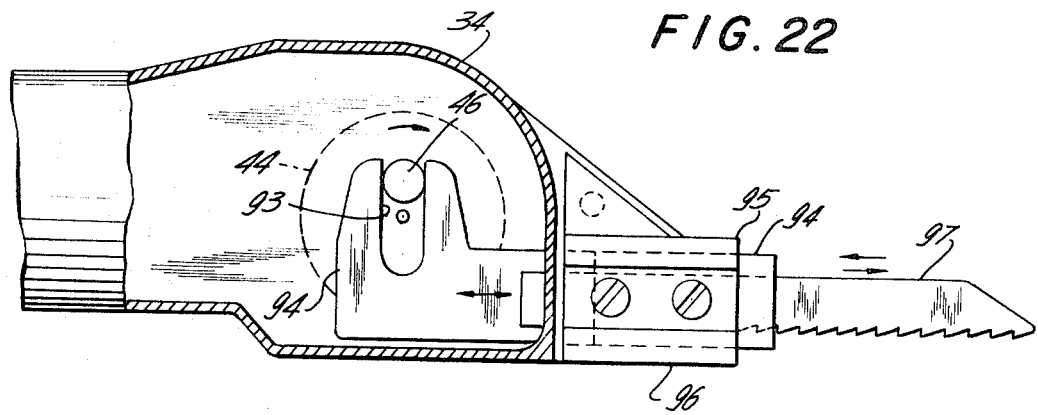
FIG. 22 is a view of the adaption of the power tool for the use of reciprocatingly operating tools, partly broken away.
Figure 23:
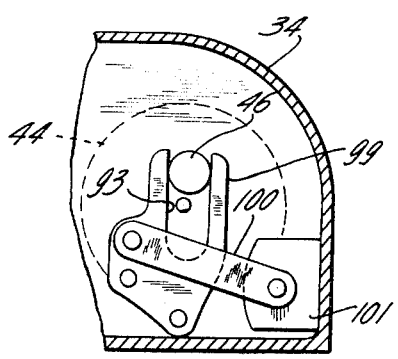
FIG. 23 is a view of another mechanism for generating a reciprocation movement of the tool.
Figure 24:
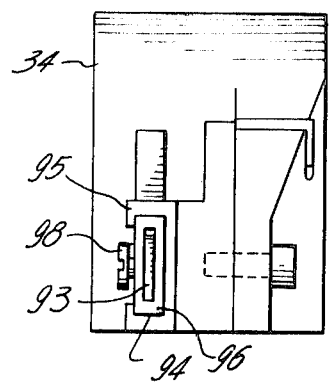
FIG. 24 is a front view of the adaption shown in FIG. 22.
Figure 25:
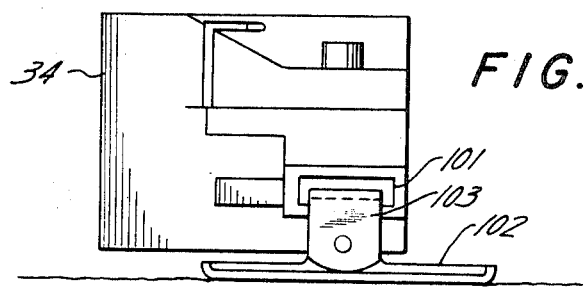
FIG. 25 is a view of a sanding tool attached to the reciprocating attachment shown in FIG. 22.

The blade operating mechanism, as shown in FIGS. 1 and 2, is useful for swingable tool blades, such as cutting or squeezing tools. A modification of the operating mechanism for the use of tools with reciprocating movement is shown in FIGS. 22-25. Tools of this kind include saws, files, mortising chisels, sanding and grinding pads, burnishing irons, polishing and the like attachments. Stud 46 of disc 44 engages a slot 93 of a hollow slider 94 which can slide between slide gibs 95, 96. The tool (shown as a saw blade 97) is fastened by screws 98 on slider 94. Gibs 95, 96 are fastened on housing 34. An alternative drive is shown in FIG. 23, wherein the single slider crank motion is substituted by a four bar linkage, comprising a swing 99 and a connecting bar 100 which is articulatedly connected with swing 99 and slider 101. Instead of a saw blade 97, such as shown in FIG. 22, a grinding or sanding pad 102 may be attached to a suitable bar 103 which in turn is fastened on slider 94 (FIG. 25). FIGS. 8A and 8B show a further modification of the trigger control mechanism for the motion transmitting means. When motor 41 is running and gear 45 is continuously rotating, disc 44 is inoperative when trigger 78' is in the idle or off position. Trigger plate 76' shown enlarged in FIG. 8B, is in the position shown in dotted lines. Edge 100 of trigger plate 76' outwardly movees vertical portion 101 of horseshoe spring 102 out of engagement with slot 103 of stop lever 68'. This frees stop lever 68' from engagement with trip lever 62" allowing downwardly extending tongue 104 on trigger plate 76' to engage straight edge 105 of stop lever 68' and swing stop lever 68' inwardly to engage ramp portion 58 of sleeve 54, raising the same, and allowing pin 59 to freely pass under sleeve 54. Thus, hollow shaft 43 is disconencted from drive pin 59, deactivating disc 44.

When trigger 78' is moved by the operator to the center position of its travel, tongue 104 is moved out of engagement with straight edge 105 of stop lever 68' and vertical portion 101 of spring 102 rides down cam edge 100 and engages slot 103. Pin 60' now activates both trip lever 62" and stop lever 68' together, causing the intermittent motion of disc 44. When trigger 78' is moved by the operator into its furthest clockwise position, straight edge 106 of trigger plate 76' simultaneously rotates both trip lever 62" and stop lever 68', freeing them from pin 60' on gear 45. Thus, sleeve 54 is now permitted to remain in its normal downward position to be continuously driven by pin 59, that is, sleeve 54 is now free to pursue its circular path and drive disc 44, without interruption. This mechanism simplifies the trigger control mechanism for the motion transmitting means, which is shown in FIG. 8, by replacing the arm 64 of lever 62 and lever 68 with a single lever 68'.

An electrical switch (not shown) is provided for starting and reversing the motor 41. It may be desired to reverse the rotation of the motor, for example, when the shear blades are jammed by an obstacle to separate the blades.

It is to be noted that the design of the moving parts are such as to permit reversal of movement of all operating parts thereby preventing damage to the device.

The tool device accommodates removable blades for cutting operations, also straight shears of different lengths; it is a tool device that will cut through material in a single cycle of operation if the trigger is actuated once and released; that will operate with a "dwell" between strokes, or cut continuously if the trigger is held fully back. The device may incorporate a saw attachment that will permit delicate work of "scroll" type and permit the saw blade to be set at a desired depth so that the cut may be "bottoming" that is, sawing in a blind hole; or metal cutting shears, or a filing or sanding tool. The construction of the tool device is such that it is "in line" with the blades to be used so that the curves are easily followed in working on vertical work.

While the invention has been described and illustrated with respect to certain preferred examples which give satisfactory results, it will be understood by those skilled in the art after understanding the principle of the invention, that various changes and modifications may be made without departing from the spirit and scope of the invention and it is intended therefore to cover all such changes and modifications in the appended claims.

What we claim is:

1. Power-operated device for driving a movable tool member, having a motor, drive means connected to said motor for operating said movable tool member, and a trigger mechanism controlling operations of said drive means, said drive means having a continuously rotatable member, a second rotatable member to which said movable tool member may be connected, motion transmitting means from said continuously rotatable member to said second rotatable member for continuous, intermittent and stop motions thereof selectively, controllable by said trigger mechanism, said device comprising connecting means between said tool member and said second rotatable member for swinging movement of said tool member, said connecting means consisting of a stud on said second rotatable member and of a lot on said movable tool member, said stud slidingly engaging said slot.

2. Power-operated device according to claim 1, a stationary tool member, said tool members cooperating for a shearing action therebetween.

3. Power-operated device according to claim 1, said connecting means between said tool member and said second rotatable member comprising a mechanism for reciprocating movement of said tool member.

4. Power-operated device according to claim 1, said motion transmitting means having operating means for selective operation of said second rotatable member by said continuously rotatable member, said operating means operatively connected with said trigger means, said second rotatable member having means connecting said second member with said tool member for driving the latter.

5. Power-operated device according to claim 4, said trigger mechanism having lever means cooperable with both said continuously rotatable member and said selective operation means, said latter means cooperable with said continuously rotatable member.

6. Power-operated device for driving a movable tool member, comprising motor means, drive means connected to said motor means for operating said movable tool member, trigger means controlling operations of said drive means, said drive means comprising a continuously rotatable member, a second rotatable member to which said movable tool member may be connected, means for transmitting motion from said continuously rotatable member to said second rotatable member for continuous, trollable by said trigger means, a stationary shaft, said intermittent and stop motions thereof selectively, concontinuously rotatable member being rotably mounted thereon, said motion transmitting means comprising a shaft rotably mounted with relation to said stationary shaft and fixedly carrying said second rotatable member, liftable means disposed to be rotated by said rotatably mounted shaft, spring means urging said liftable means in one direction, and means on said continuously rotatable member and cooperable with said liftable means, said liftable means controllable by said trigger means.

7. Power-operated device for driving a movable tool member, comprising motor means, drive means connected to said motor means for operating said movable tool member, and trigger means controlling operations of said drive means, said drive means comprising a continuously rotatable member, a second rotatable member to which said movable tool member can be connected, means for transmitting motion from said continuously rotatable member to said second rotatable member for continuous, intermittent and stop motions thereof selectively, controllable by said trigger means, means for connecting said tool member to said second rotatable member for swinging movement of said tool member, said motion transmitting means having means for selective operation of said second rotatable member by said continuously rotatable member, through activation of said trigger means, said second rotatable member having means connecting said second member with said tool member for driving the latter, said trigger means having lever means cooperable with both said continuously rotatable member and said selective operation means, said latter means cooperable with said continuously rotatable member, a stationary shaft, said continuously rotatable member being rotably mounted thereon, said selective operation means comprising a shaft rotably mounted with relation to said stationary shaft and fixedly carrying said second rotatable member, liftable means disposed to be rotated by said rotatably mounted shaft, and spring means urging said liftable means in one direction.

8. Power-operated device according to claim 7, and connecting means between said tool and said second rotatable member, said connecting means comprising a mechanism for swinging movement thereof.

9. Power-operated device according to claim 8, and a stationary tool member, said members cooperating for a shearing action therebetween.

10. Power-operated device according to claim 7, and a slider crank mechanism operatively disposed on said tool for reciprocating movement thereof.

11. Power-operated device according to claim 7, said liftable means comprising a longitudinally movable sleeve member having a protrusion and arranged over said rotatable shaft.

12. Power-operated device according to claim 7, said liftable means comprising a hinged bar member.

13. Power-operated device according to claim 6, said trigger means comprising a trigger, a trigger plate, a stop lever and a trip lever which cooperate together for positioning said liftable means for continuous and intermittent motions selectively of said second rotatable member.

14. Power-operated tool comprising a movable tool member, motor means, drive means connecting said motor means and said movable tool member, trigger means controlling operations of said drive means, said drive means comprising a first stationary shaft, a hollow shaft rotatably mounted on said shaft, a gear freely rotatable on said stationary shaft, an axially slidable sleeve on said hollow shaft, said sleeve rotatably engaging said hollow shaft, said hollow shaft having a disc fixed thereto, said disc having a stud on the face thereof, and said sleeve having a protrusion, said protrusion having a ramp-like face.

15. A power-operated device according to claim 14, said gear having two pins, at least one of said pins being on the upper face of said gear adapted to drivingly engage said protrusion.

16. A power-operated device according to claim 15, said trigger means comprising a rotatably mounted double arm lever, said arms being engageable by said pins, respectively.

17. A power-operated device according to claim 16, said trigger means further comprising an intermediate lever, said intermediate lever having an arm disposed over the upper face of said gear, and stop means on said latter arm.

18. A power-operated device according to claim 17, said trigger means further comprising a trigger plate and a trigger, said trigger and said trigger plate operatively engaging said intermediate and said double arm levers for setting both said levers selectively in several positions for various modes of operation of said movable tool member.

19. A power-operated device according to claim 18, said intermediate lever having first means on its said arm, said first means lifting said protrusion out of engagement with said pin on the upper face of said gear and said stop means preventing said sleeve from rotating while said gear continues rotating.

20. A power-operated device according to claim 19, one of said arms of said double arm lever having second means for slidingly engaging said ramp-like face for lifting said sleeve temporarily out of engagement with said pin on the upper face of said gear, during one revolution of said gear, while the other of said two pins engaging an arm of said double arm lever causes breaking said engagement of said ramp-like face with said second means, dropping said sleeve back into engagement with said pin drivingly engaging said protrusion during a second revolution of said gear.

21. A power-operated device according to claim 14, said gear having two driving pins on the upper face thereof, one of said pins adapted to drivingly engage said protruding bar of said sleeve, said pins arranged at different radii on said gear.

22. A power-operated device according to claim 21, and a lever having two arms of different length slidingly engaging said upper face of said gear, the short arm thereof having a tapered end for temporarily engaging said ramp-like face of said protruding bar of said sleeve, and the long arm thereof having a face for engaging one of said pins.

23. A power-operated device according to claim 14, said gear having a first driving pin on the upper face and a second driving pin on the lower face thereof, said first driving pin being adapted to drivingly engage said protrusion.

24. A power-operated device according to claim 23, said trigger means comprising a second stationary shaft, a lowermost lever rotatably arranged on said second shaft, said lowermost lever having an upper arm slidable on said upper face of said gear and having a lower arm slidable on said lower face of said gear, said upper and said lower arms being engageable by said first pin and said second pin, respectively.

25. A power-operated device according to claim 24, said trigger means further comprising an intermediate lever, said intermediate lever having an arm glidingly arranged on the upper face of said gear, and stop means on said latter arm.

26. A power-operated device according to claim 25, said trigger means further comprising a trigger plate and a trigger, said trigger and said trigger plate operatively engaging said intermediate and said lowermost levers for setting both said levers selectively in several positions for various modes of operation of said movable tool member.

27. A power-operated device according to claim 26, said intermdiate lever having first means on its said arm, said first means lifting said protrusion out of engagement with said first pin, and said stop means preventing said sleeve from rotating while said gear continues rotating.

28. A power-operated device according to claim 27, said upper arm of said lowermost lever having second means for slidingly engaging said ramp-like face for lifting said sleeve temporarily out of engagement with said first driving pin during one revolution of said gear while said second pin engaging said lower arm of said lowermost lever causes breaking said engagement of said ramp-like face with said second means, dropping said sleeve back into engagement with said first pin during a second revolution of said gear.

29. A power-operated device according to claim 14, and connecting means between said tool member and said second rotatable member, said connecting means comprising a mechanism for swinging movement of said tool member.

30. A power-operated device according to claim 14, a stationary tool member, said tool members cooperating for a shearing action therebetween.

31. A power-operated device according to claim 14, and a slider crank mechanism connecting said tool member to said second rotatable member for reciprocating movement thereof.

References Cited

UNITED STATES PATENTS

| | | | |
|---|---|---|---|
| 1,765,527 | 6/1930 | Gollnick | 192—33X |
| 2,483,203 | 9/1949 | Janke | 192—33X |
| 2,515,606 | 7/1950 | Linder | 192—33X |
| 2,637,103 | 5/1953 | Hooker | 30—228 |
| 3,321,982 | 5/1967 | Maunus | 74—125.5X |

LESTER M. SWINGLE, Primary Examiner

J. C. PETERS, Assistant Examiner

U.S. Cl. X.R.

30—272; 74—125.5; 192—33